(12) United States Patent
Hupfield et al.

(10) Patent No.: US 7,238,768 B2
(45) Date of Patent: Jul. 3, 2007

(54) POLYSILOXANES AND THEIR PREPARATION

(75) Inventors: Peter Cheshire Hupfield, Carmarthen (GB); Avril Surgenor, Cardiff (GB); Stephen Westall, Barry (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 11/602,559

(22) Filed: Nov. 21, 2006

(65) Prior Publication Data

US 2007/0073028 A1    Mar. 29, 2007

Related U.S. Application Data

(62) Division of application No. 10/486,486, filed as application No. PCT/EP02/09821 on Apr. 12, 2002, now abandoned.

(30) Foreign Application Priority Data

Aug. 17, 2001    (GB)    ................. 0120058.3

(51) Int. Cl.
*C08G 77/26*    (2006.01)
(52) U.S. Cl. .................. 528/38; 528/26; 528/29; 528/34; 528/12; 556/425
(58) Field of Classification Search ............... 528/12, 528/26, 29, 34, 38; 556/425
See application file for complete search history.

(56) References Cited

U.S. PATENT DOCUMENTS

| 4,496,687 A | 1/1985 | Okada et al. |
| 4,496,705 A | 1/1985 | Florence et al. |
| 4,508,887 A | 4/1985 | Kohl |
| 4,523,002 A | 6/1985 | Campbell et al. |
| 4,525,567 A | 6/1985 | Campbell et al. |
| 4,633,002 A | 12/1986 | Piskoti et al. |
| 4,699,988 A * | 10/1987 | Traver et al. ............... 556/425 |
| 4,785,067 A | 11/1988 | Brumbill et al. |
| 4,915,938 A * | 4/1990 | Zawadzki ............... 424/70.122 |
| 4,950,506 A | 8/1990 | Halloran et al. |
| 4,950,770 A | 8/1990 | Heindel et al. |
| 5,115,049 A | 5/1992 | Imperante et al. |
| 5,164,522 A | 11/1992 | McCarthy et al. |
| 5,352,817 A | 10/1994 | McCarthy et al. |
| 5,391,675 A | 2/1995 | Cray et al. |
| 5,725,790 A * | 3/1998 | Osawa et al. ............... 252/8.62 |
| 6,124,490 A * | 9/2000 | Gormley et al. ............ 556/425 |
| 6,284,860 B1 | 9/2001 | Sommer et al. |
| 6,548,465 B2 * | 4/2003 | Perry et al. .................. 510/285 |
| 6,605,123 B1 * | 8/2003 | Kasson et al. .................. 8/142 |

FOREIGN PATENT DOCUMENTS

| EP | 587343 | 3/1994 |
| EP | 856553 | 8/1998 |

* cited by examiner

*Primary Examiner*—Margaret G. Moore
(74) *Attorney, Agent, or Firm*—Alan Zombeck

(57) ABSTRACT

An amino-functional polysiloxane is prepared by reacting an aminosilane (A) which contains an aminoalkyl group and at least one alkoxy group bonded to Si with a carboxylic acid and a silanol-functional polysiloxane (B). The aminosilane (A) is partially converted into its carboxylate salt which acts as a catalyst for the siloxane condensation polymerization reaction between (A) and (B).

23 Claims, No Drawings

POLYSILOXANES AND THEIR PREPARATION

CROSS REFERENCE TO RELATED APPLICATIONS

This application is a divisional application of U.S. Ser. No. 10/486,486 filed on May 13, 2004 now abandoned, which is a national application U.S. national stage filing under 35 U.S.C. §371 of PCT Application No. PCT/EP02/09821 filed on 12 Apr. 2002, currently pending, which claims the benefit of GB Application No. 0120058.3 filed 7 Apr. 2001 under 35 U.S.C. §119.

FIELD OF THE INVENTION

This invention relates to amino-functional polysiloxanes and to their preparation and to polysiloxane compositions containing them.

BACKGROUND TO THE INVENTION

Amino-functional polysiloxanes are widely used in the textile industry as fibre lubricants and as fabric softeners and anti-wrinkle agents, and are also used in the personal care industry as hair conditioners and in skin care compositions.

Amino-functional polysiloxanes can be prepared by mixing a catalyst comprising both (i) at least one compound selected from barium hydroxide and strontium hydroxide and (ii) at least one compound selected from borates and phosphates of sodium with a silanol terminated organopolysiloxane compound and an organosilicon compound having at least one silicon-bonded alkoxy or alkoxyalkoxy group and an aminoalkyl group and reacting at a temperature of at least 50° C., as described in U.S. Pat. No. 5,391,675. This process is effective in preparing the amino-functional polysiloxane but requires an intensive filtration step to remove catalyst residues. Residual barium is often present in materials made via this route due to complexation with amine functionality. This may be detrimental in certain applications.

U.S. Pat. No. 5,344,906 describes a process for the production of an organosilicon condensation product which comprises contacting an organosilicon compound having at least one silanol group and wherein the silicon-bonded organic substituents can be hydrocarbon groups optionally substituted by amino, halogen, mercapto, hydroxyl, amido or ester substituents, with a quaternary ammonium phosphate, borate, carbonate or silicate.

U.S. Pat. No. 4,633,002 describes a process for the preparation of an aminofunctional organosilicone compound comprising reacting a silanol-terminated organosilicone compound with an aminofunctional silane compound in the presence of a catalytic amount of an organometallic compound.

WO-A-99/06486 and US-B-6284860 describe preparation of amino-functional polysiloxanes by reacting an organopolysiloxane with OH end groups with an alkoxysilane which contains at least one secondary or tertiary amine group in the presence of a Bronstedt or Lewis acid. The Bronstedt or Lewis acid, which is preferably an acidic phosphoric ester, but can be an inorganic acid or a sulphonic or carboxylic acid, is used in equivalent amount or a slight excess based on OH groups of the OH-terminated organopolysiloxane, and the alkoxysilane is added in stoichiometric excess based on the OH-terminated organopolysiloxane.

SUMMARY OF THE INVENTION

A process according to the present invention for the preparation of an amino-functional polysiloxane comprises reacting an aminosilane (A) which contains an aminoalkyl group and at least one alkoxy group bonded to Si with a carboxylic acid and a silanol-functional polysiloxane (B), the amount of carboxylic acid (C) being such that the molar ratio of carboxylic acid groups of (C) to amino groups of aminosilane (A) is less than 1:1 and the amount of silanol-functional polysiloxane (B) being such that the molar ratio of silanol groups of (B) to Si-bonded alkoxy groups of aminosilane (A) is greater than 1:1, whereby the aminosilane (A) is at least partially converted into its carboxylate salt which acts as a catalyst for the siloxane condensation polymerization reaction between (A) and (B).

The process of the invention has the advantage that the amino-functional polysiloxane reaction product does not contain unwanted catalyst residues. The amine carboxylate salt which acts as catalyst is incorporated in the amino-functional polysiloxane as amine units which are in carboxylate salt form. The amine carboxylate salt is an excellent catalyst for the reaction between SiOH groups and Si-bonded alkoxy groups, and is also a good catalyst for the siloxane chain extending reaction of SiOH groups with SiOH groups. The amino-functional polysiloxane reaction product does not require filtration, nor does it require heat treatment to decompose the ammonium salt catalyst, which has the risk of generating trialkylamine odour in the product. The amino-functional polysiloxane can be prepared as a clear liquid reaction product which is ready for use in many applications.

DETAILED DESCRIPTION OF THE INVENTION

The aminosilane (A) contains an aminoalkyl group and at least one alkoxy group bonded to Si. The aminoalkyl group is preferably of the formula R—(NH-A')$_q$—NH-A- wherein A and A' are each independently a linear or branched alkylene group having 1 to 6 carbon atoms and optionally containing an ether linkage; q=0-4; R is hydrogen or an alkyl or hydroxyalkyl group having 1 to 4 carbon atoms. Most preferably R is hydrogen; q=0 or 1; and A and A' (if present) each contain 2 to 4 carbon atoms. Examples of preferred aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH (CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)3NH$_2$, —(CH$_2$)$_3$NH(CH$_2$)$_4$NH$_2$ and —(CH$_2$)$_3$O(CH$_2$)$_2$NH$_2$. The alkoxy group bonded to Si can contain an unreactive substituent or linkage such as an ether linkage. The aminosilane (A) preferably has the formula

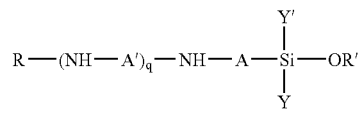

wherein A, A', q and R are defined as above; R' is an alkyl or alkoxyalkyl group having 1 to 6 carbon atoms, for example, methyl, ethyl, butyl or methoxyethyl; and Y and Y' are each independently a group —OR' or an optionally substituted alkyl or aryl group. Most preferably, for the preparation of linear polydiorganosiloxanes, the group Y of aminosilane (A) is an unsubstituted alkyl group such as methyl and the group Y' is of the formula —OR', preferably methoxy or ethoxy. Examples of preferred aminosilanes (A) are aminoethyl-aminoisobutyl methyl dimethoxy silane $(CH_3O)_2(CH_3)Si$—$CH_2CH(CH_3)CH_2NH(CH_2)_2NH_2$ and aminopropyl methyl diethoxy silane $(C_2H_5O)_2(CH_3)Si$—$(CH_2)_3NH_2$.

The silanol-functional polysiloxane (B) is preferably a linear hydroxyl-tipped polydiorganosiloxane. It can for example be a linear hydroxyl-tipped polydimethylsiloxane, preferably a liquid polydimethylsiloxane of degree of polymerisation 4-1000, most preferably 10-100. Alternatively the polysiloxane (B) can contain 2-30C alkyl, for example, ethyl, propyl, pentyl or hexyl, substituted alkyl, for example fluoroalkyl such as 3,3,3-trifluoropropyl, or alkenyl, for example vinyl, allyl or hexenyl, groups or aryl, for example phenyl, or aralkyl, for example 2-phenylpropyl, groups bonded to Si. Such groups may for example be present as —Si(CH$_3$)R"—O— units, where R" is 2-30C alkyl or alkenyl, aryl or aralkyl, or as —Si(R")$_2$—O— units. Preferably at least 80% of the total silicon-bonded substituents are methyl groups.

The amount of silanol-functional polysiloxane (B) used is sufficient that the molar ratio of silanol groups of (B) to Si-bonded alkoxy groups of aminosilane (A) is greater than 1:1. This ensures that chain extension polymerization takes place, rather than merely capping of the silanol-functional polysiloxane (B) by the amino-functional alkoxysilane (A). The molar ratio of silanol groups of (B) to Si-bonded alkoxy groups of aminosilane (A) is preferably in the range (1.2-2.0:1?).

The carboxylic acid used in the reaction, which reacts with the aminosilane (A) to form a carboxylate salt catalyst, can be chosen from a wide range of carboxylic acids, although the choice of carboxylic acid can affect the physical form of the amino-functional polysiloxane reaction product. The carboxylic acid can for example be an aliphatic carboxylic acid having 1 or 2 up to 20 carbon atoms. We have found that aliphatic carboxylic acids having at least 4 carbon atoms have the advantage of producing a clear liquid reaction product. The use of aliphatic carboxylic acids having 6 to 20, particularly 8 to 18 carbon atoms, for example octanoic, decanoic or lauric acid, to produce a clear reaction product is one preferred embodiment of the invention. Aliphatic carboxylic acids having 1 to 3 carbon atoms, for example acetic or propionic acid, or carboxylic acids substituted by a hydrophilic group such as hydroxyl, for example lactic acid, can be used but may form a hazy amino-functional polysiloxane reaction product in the absence of any co-solvent. Carboxylic acids substituted by an electron-withdrawing moiety, for example halogen such as fluorine or chlorine or a hydroxyl group, may be preferred since amine carboxylate catalysts formed from these acids yield products with considerably reduced odour. Examples of such acids substituted by an electron-withdrawing moiety are lactic acid and fluoroalkanoic acids such as fluoroacetic acid or 4,4,4-trifluorobutanoic acid.

The carboxylic acid is preferably used at 0.05-5, particularly 0.1 or 0.2 up to 1.0 or 2.0,% by weight based on the aminosilane (A). At this level of addition the molar ratio of carboxylic acid groups of (C) to amino groups of aminosilane (A) is less than 1:1, and is generally in the range 0.002-0.25:1. Accordingly, only a minor proportion of the amino groups of the aminosilane (A), for example 0.2-25% of the amino groups, are in carboxylate salt form.

In one preferred process according to the invention, an alcohol is co-reacted with the aminosilane (A), carboxylic acid and silanol-functional polysiloxane (B). The alcohol tends to become incorporated in the amino-functional polysiloxane as an end-blocking alkoxy group. The reaction between the alcohol group and Si—OH groups is much slower than that between Si-alkoxy groups and Si—OH groups, but is sufficiently fast that the alcohol acts as a modifier of molecular weight. In the absence of an alcohol or any other chain-stopping reagent, high molecular weight hydroxyl-tipped amino-functional polysiloxanes are produced. The alcohol can be an aliphatic alcohol having 8 to 30 carbon atoms, for example n-octanol, n-decanol, octadecanol, cetyl alcohol or a commercial mixture of linear and branched 12-16C alcohols. Such high molecular weight aliphatic alcohols are preferred when producing a clear liquid reaction product using an aliphatic carboxylic acid having 6 to 20 carbon atoms. The alcohol can alternatively be an ether alcohol, for example 2-methoxypropanol or 2-butoxyethanol or a hydroxy-terminated polyether, for example a polyethoxylated fatty alcohol or a polypropylene glycol monoether. Where the carboxylic acid reacted with the aminosilane (A) is an alkanoic acid having 1 to 3 carbon atoms or a hydroxy-substituted carboxylic acid, the alcohol can advantageously be a linear or branched alkanol having 2 to 4 carbon atoms, particularly a branched alcohol such as isopropanol or isobutanol. The 2-4C alcohol acts as a cosolvent allowing the formation of a clear liquid amino-functional polysiloxane reaction product.

The reaction between the aminosilane (A), carboxylic acid and silanol-functional polysiloxane (B) can in general be carried out at any temperature in the range 0-200° C. Temperatures of at least 50° C. are preferred, most preferably from 60° C. up to 120 or 140° C. Such elevated temperatures are particularly preferred for reactions in which the aminosilane (A) has only two alkoxy groups bonded to Si, since the initial reaction of the aminosilane with the silanol-functional polysiloxane (B) forms a polysiloxane (B) terminated with a single somewhat hindered Si-bonded alkoxy group. The reaction can in general be carried out at pressures in the range from 5 mbar up to 5 bar, for example at ambient pressure; it is frequently preferred that at least the later part of the reaction is carried out under reduced pressure, for example 10 to 400 mbar, particularly if there is a need to promote removal of volatile by-product (such as methanol or ethanol evolved from the amino-functional alkoxysilane) from the reaction system.

The reaction between the aminosilane (A), carboxylic acid and silanol-functional polysiloxane (B) can conveniently be carried out undiluted in the liquid phase, since the polysiloxane (B) generally has a low enough viscosity to permit ready reaction. The reaction can alternatively be carried out in solution, dispersion or emulsion. Reaction in emulsion may be preferred if the aminosiloxane product is to be used in emulsion; textile treating agents such as fibre lubricants, softening agents and anti-wrinkle agents are often applied from emulsion.

In one preferred process, the aminosilane (A), the carboxylic acid and the silanol-functional polysiloxane (B) are mixed with a surfactant and water to form an emulsion, and the condensation reaction between (A) and (B) is carried out in the emulsion, thereby forming an emulsion of an amino-functional polysiloxane. The surfactant can for example be a nonionic, anionic or cationic surfactant, for example an ethoxylated alcohol or phenol nonionic surfactant. The amount of surfactant added can for example be at least 0.2% based on the total weight of silanol-functional polysiloxane (B) and aminosilane (A), preferably at least 0.5%, for example from 2% up to 10 or 20%. Water is preferably added in two stages. The aminosilane (A), the carboxylic acid and the silanol-functional polysiloxane (B) are first mixed with a surfactant and a small amount of water to form a viscous oil in water emulsion ("thick phase"). The amount of water added at this stage is generally at least 0.5% based on the total weight of silanol-functional polysiloxane (B) and aminosilane (A), preferably at least 1% up to 10 or 20%. Further water can subsequently be added, for example from 20 or 30% up to 100 or 200%, to form a diluted emulsion of suitable viscosity for carrying out the condensation reaction between (A) and (B). In general it is preferred that the aminosilane (A), carboxylic acid, silanol-functional polysiloxane (B), surfactant and water are mixed to from an emulsion at a low temperature, generally below 50° C., for example ambient temperature, and the emulsion is heated to a temperature in the range 50-200° C., preferably 60-140° C., to effect the condensation reaction.

The emulsion of amino-functional polysiloxane produced is generally of low particle size, for example less than 500 nm and frequently less than 300 nm. If the mixture of aminosilane (A), carboxylic acid, silanol-functional polysiloxane (B), surfactant and water are acidified to a pH below 4, for example in the range 2 to 4 and preferably about pH3, it may be possible to form a microemulsion, that is an emulsion of particle size below 100 nm, for example 5 to 50 nm, which forms without need for vigorous mixing. Such a low pH can be achieved by use of a carboxylic acid of low pKa and/or by use of an acid-functional surfactant of low pKa.

The time of reaction can for example be from 10 minutes up to 24 hours. The reaction can be quenched after a desired time by adding water or an alcohol endblocker to the reagents, although quenching is not necessary. The alcohol endblocker can be selected from the alcohols described above. The reaction can be substantially slowed by removal of heat and if a modifier of molecular weight such as an alcohol is present an equilibrium will be reached. If water quenching is used, the product is a dispersion or emulsion in which the amino-functional polysiloxane is generally stably dispersed.

Because the amine carboxylate is a highly selective catalyst for the reaction between Si—OH and Si-alkoxy and does not catalyse chain scission and equilibration of Si—O—Si bonds, the amino-functional polysiloxane produced has a more regular structure than amino-functional polysiloxanes produced by known methods. The amino-functional polysiloxane produced according to the invention has the formula

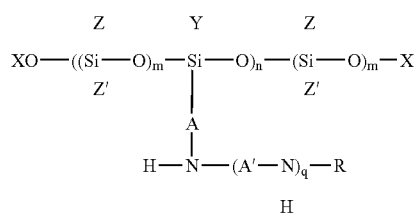

where A, A', R and q are defined as above; Y is an optionally substituted alkyl or aryl group; Z and Z', which can be the same or different, are each an optionally substituted alkyl, aryl or aralkyl group; X is hydrogen or an aliphatic group optionally containing one or more ether linkages; m is for example 4-1000; and n is for example 1-1000, preferably 2-100. Most preferably Y, Z and Z' are all methyl groups. The majority, and usually at least 90%, of the

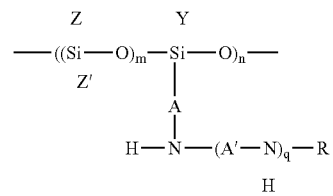

units in the amino-functional polymer retain the chain length m of the silanol-functional polysiloxane (B). Where an alcohol is co-reacted with the aminosilane (A), carboxylic acid and silanol-functional polysiloxane (B), at least one, and usually both, the groups X are generally derived from the alcohol. For example, if the alcohol is an aliphatic alcohol having 8 to 30 carbon atoms, each group X in the amino-functional polysiloxane is usually an aliphatic group having 8 to 30 carbon atoms.

The reaction between the aminosilane (A), carboxylic acid and silanol-functional polysiloxane (B) can if desired be carried out in the presence of a liquid organic or silicone non-reactive diluent. A preferred diluent is a non-reactive polysiloxane having a viscosity of less than 375 mPas, for example 5 to 100 mPa·s. Examples of such polysiloxanes include hexamethyldisiloxane, octamethyltrisiloxane, decamethyltetrasiloxane, dodecamethylpentasiloxane, tetradecamethylhexasiloxane or hexadecamethylheptasiloxane, octamethylcyclotetrasiloxane, decamethylcyclopentasiloxane or dodecamethylcyclohexasiloxane, heptamethyl-3-{(trimethylsilyl)oxy}-trisiloxane ($M_3T$), hexamethyl-3,3,bis{(trimethylsilyl)oxy}trisiloxane ($M_4Q$) or pentamethyl{(trimethylsilyl)oxy}cyclotrisiloxane, or a non-reactive, for example trimethylsilyl-terminated, polydimethylsiloxane. Cyclic polysiloxanes having at least 5 silicon atoms, especially decamethylcyclopentasiloxane (D5), are particularly preferred. For skin contact uses, it is sometimes preferred to avoid the presence of octamethylcyclotetrasiloxane (D4). The process of the present invention has the advantage that the amine carboxylate is a highly selective catalyst for the reaction between Si—OH and Si-alkoxy and does not catalyse chain scission and equilibration of Si—O—Si bonds. Thus the reaction can be carried out in a non-reactive siloxane such as D5 or a trimethylsilyl-terminated, polydimethylsiloxane without formation of any cyclotetrasiloxane by-product.

The liquid organic or silicone non-reactive diluent can be present from the start of the reaction or can be added during the reaction. Use of the non-reactive diluent allows the production of easily handled compositions containing amino-functional polysiloxanes of high molecular weight and high viscosity. Amino-functional polysiloxanes of viscosity above 10 Pa·s, preferably above 20 Pa·s, and up to 100 Pa·s or more can be prepared as solutions or dispersions of viscosity suitable for application in textile and personal care. Solutions of such high viscosity amino-functional polysiloxanes in a non-reactive cyclic polysiloxane having at least 5 silicon atoms and having a viscosity of less than 375 mPa·s. are new and useful compositions. Where the non-reactive diluent is a silicone, the product is generally a solution of the amino-functional polysiloxane. These high viscosity amino-functional polysiloxanes are particularly effective in conditioning of hair and as fibre lubricants.

When producing high molecular weight amino-functional polysiloxanes, it may be preferred to remove some reagent during the later stages of preparation. For example, the aminosilane (A), carboxylic acid and silanol-functional polysiloxane (B) can initially be reacted in the presence of an alcohol which acts as a chain terminating agent. A silicone non-reactive diluent can be added during the reaction. The reaction can then be continued to increase the chain length of the amino-functional polysiloxane. Such continued reaction can for example be at increased temperature and/or reduced pressure to promote removal of the alcohol. The amount of liquid organic or silicone non-reactive diluent present can for example be from 10 to 2000%, preferably 20 to 500% by weight based on the total weight of aminosilane (A) and silanol-functional polysiloxane (B). The resulting solution of amino-functional polysiloxane in non-reactive diluent can be further diluted for use if required.

The polysiloxane composition product, comprising a substantially linear amino-functional polydiorganosiloxane having at least one group of the formula R—(NH-A')$_q$—NH-A- bonded to silicon, where A, A', R and q are defined as in claim 2, and having a viscosity of at least 10 Pa·s, dissolved in a non-reactive polysiloxane having a viscosity of less than 375 mPa·s, is a valuable product for use in hair conditioning or textile treatment. The weight ratio of amino-functional polysiloxane to non-reactive polysiloxane is preferably from 10:1 to 1:50. If no D4 is used in the production of the composition, the D4 content of the composition is generally less than 0.25% by weight of the silicone materials present, usually less than 0.1% and frequently less than 0.01%.

The amino-functional polydiorganosiloxanes produced according to the present invention can in general be used in the textile industry as fibre lubricants, for example for polyester, polyamide, acrylic, cotton or wool fibres, and as fabric softeners and/or anti-wrinkle agents, and can be used in the personal care industry as hair conditioners and in hair shampoos or skin care compositions, and can also be used as ingredients of polishes or protective coatings. In particular, when used as a conditioning agent for hair the amino-functional polydiorganosiloxanes produced according to the present invention make wet hair easier to comb and dry hair softer and easier to comb without imparting greasy characteristics to the hair.

The amino-functional polydiorganosiloxane can be used in organic solvent solution or in aqueous solution or suspension and can be used in free amine or in salt form, for example a chloride salt or a carboxylate salt produced by adding carboxylic acid to the formed amino-functional polydiorganosiloxane. Compositions containing the amino-functional polysiloxane can contain additional ingredients such as surfactants, thickeners, rheology modifying additives, perfumes, waxes, emollients, cleaning agents, lubricating oils, electrolytes, flavouring agents, biocides, pharmaceutical or cosmetic active materials.

The amino-functional polysiloxane can be chemically modified by reaction after it has been formed. Such modifications are known for example in preparing textile treatment agents. It can for example be reacted with a lactone, particularly a lactone of an omega-hydroxy carboxylic acid having 3 to 8 ring carbon atoms such as epsilon-caprolactone or gamma-butyrolactone, under the conditions described in U.S. Pat. No. 5,824,814, to form a polymer having hydroxyamide groups of the formula —N—C(O)—(CH$_2$)$_x$—OH, where x is 2 to 7. The amino-functional polysiloxane can be reacted with an epoxide to form a polymer containing beta-hydroxyamine groups, for example with ethylene oxide to form —NH—CH$_2$CH$_2$OH groups as described in U.S. Pat. No. 5,352,817 or with glycidol to form —NH—CH(CH$_2$OH)$_2$ groups. Alternatively it can be reacted with an acrylate or other activated C═C bond in a Michael-type addition, for example with hydroxyethyl acrylate to form —NH—CH$_2$—CH$_2$—COO—C$_2$H$_4$OH groups. The amino-functional polysiloxane can be quaternised by reaction with an alkylating agent such as dimethyl sulphate as described in U.S. Pat. No. 5,164,522.

EXAMPLES

The invention is illustrated by the following Examples.

Example 1

A silanol end-blocked with a viscosity of approximately 60 cP (90 g), aminoethyl-aminoisobutyl methyl dimethoxy silane (5.0 g), acetic acid (0.5 g) and a C$_{13}$-C$_{15}$ aliphatic alcohol (5.1 g) were charged to a three necked flask fitted with a condenser and thermometer, upon which they were heated to 85° C. for two hours under nitrogen. The reaction mixture was then devolatilised at 85° C. under reduced pressure (100 mbar) for four hours. The resulting hazy fluid was an amino-functional polydimethylsiloxane copolymer end capped with a mixture of C$_{13}$-C$_{15}$ alkoxy, methoxy and silanol end groups. The polymer had a viscosity of 1265 cP.

Example 2

A silanol end-blocked polydimethylsiloxane with a viscosity of approximately 60 cP (90.2 g), aminoethyl-aminoisobutyl methyl dimethoxy silane (5.2 g), octanoic acid (1.0 g) and a C$_{13}$-C$_{15}$ aliphatic alcohol (5.1 g) were charged to a three necked flask fitted with a condenser and thermometer, upon which they were heated to 85° C. for one hour under nitrogen. The reaction mixture was then devolatilised at 85° C. under reduced pressure (25 mbar) for one hour. The resulting clear fluid was an amino-functional polydimethylsiloxane copolymer end capped with a mixture of C$_{13}$-C$_{15}$ alkoxy, methoxy and silanol end groups. The polymer had a viscosity of 798 cP.

Example 3

A silanol end-blocked polydimethylsiloxane with a viscosity of approximately 60 cP (80 g), aminoethyl-aminoisobutyl methyl dimethoxy silane (5.2 g), octanoic acid (1.0 g) and a C$_{13}$-C$_{15}$ aliphatic alcohol (15 g) were charged to a three necked flask fitted with a condenser and thermometer, upon which they were heated to 85° C. for two hours under nitrogen. The reaction mixture was then devolatilised at 85° C. under reduced pressure (50 mbar) for two hours. The resulting clear fluid was an amino-functional polydimethylsiloxane copolymer end capped with a mixture of C$_{13}$-C$_{15}$ alkoxy, methoxy and silanol end groups. The polymer had a viscosity of 586 cP.

Example 4

A silanol end-blocked polydimethylsiloxane with a viscosity of approximately 60 cP (400 g), aminoethyl-aminoisobutyl methyl dimethoxy silane (25 g), octanoic acid (5.0 g) and a C$_{13}$-C$_{15}$ aliphatic alcohol (100 g) were charged to a three necked flask fitted with a condenser and thermometer, upon which they were heated to 85° C. for four hours under nitrogen. The reaction mixture was then devolatilised at 85° C. under reduced pressure (50 mbar) for two hours. The resulting clear fluid was an amino-functional polydimethylsiloxane copolymer end capped with a mixture of $C_{13}$-$C_{15}$ alkoxy, methoxy and silanol end groups. The polymer had a viscosity of 210 cP.

Example 5

A silanol end-blocked polydimethylsiloxane with a viscosity of approximately 60 cP (95.2 g), aminoethyl-aminoisobutyl methyl dimethoxy silane (3.2 g), octanoic acid (0.13 g) and a $C_{13}$-$C_{15}$ aliphatic alcohol (1.7 g) were charged to a three necked flask fitted with a condenser and thermometer, upon which they were heated to 85° C. for four hours under nitrogen. The reaction mixture was then devolatilised at 85° C. under reduced pressure (100 mbar) for four hours. After four hours the reaction was terminated to yield a clear aminofunctional siloxane The resulting clear fluid was an amino-functional polydimethylsiloxane copolymer end capped with a mixture of $C_{13}$-$C_{15}$ alkoxy, methoxy and silanol end groups. The polymer had a viscosity of 903 cP.

Example 6

A silanol end-blocked polydimethylsiloxane with a viscosity of approximately 60 cP (95 g), aminoethyl-aminoisobutyl methyl dimethoxy silane (3.3 g), heptafluorononanoic acid (0.5 g) and a $C_{13}$-$C_{15}$ aliphatic alcohol (15 g) were charged to a three necked flask fitted with a condenser and thermometer, upon which they were heated to 85° C. for three hours under nitrogen. The reaction mixture was then devolatilised at 100° C. under reduced pressure (100 mbar) for three hours. The resulting clear fluid was an amino-functional polydimethylsiloxane copolymer end capped with a mixture of $C_{13}$-$C_{15}$ alkoxy, methoxy and silanol end groups. The polymer had a viscosity of 1222 cP.

Example 7

A silanol end-blocked polydimethylsiloxane with a viscosity of approximately 60 cP (259.1 g), aminoethyl-aminoisobutyl methyl dimethoxy silane (15.5 g), octanoic acid (0.88 g) and a $C_{13}$-$C_{15}$ aliphatic alcohol (18.3 g) were charged to a three necked flask fitted with a condenser and thermometer, upon which they were heated to 85° C. for two hours under nitrogen. The reaction mixture was then devolatilised at 85° C. under reduced pressure (20 mbar) for six hours. The resulting clear fluid was an amino-functional polydimethylsiloxane copolymer end capped with a mixture of $C_{13}$-$C_{15}$ alkoxy, methoxy and silanol end groups. The polymer had a viscosity of 6,099 cP.

Example 8

A silanol end-blocked polydimethylsiloxane with a viscosity of approximately 60 cP (98 g), aminoethyl-aminoisobutyl methyl dimethoxy silane (1.99 g) and octanoic acid (0.50 g) were charged to a three necked flask fitted with a condenser and thermometer, upon which they were heated to 85° C. for two hours under nitrogen. The reaction mixture was then devolatilised at 85° C. under reduced pressure (20 mbar) for two hours. The resulting clear fluid was an amino-functional polydimethylsiloxane copolymer end capped with a mixture of methoxy and silanol end groups. The polymer had a viscosity of 10,690 cP.

Example 9

A silanol end-blocked polydimethylsiloxane with a viscosity of approximately 60 cP (139.8 g), aminoethyl-aminoisobutyl methyl dimethoxy silane (7.35 g), lactic acid (0.10 g) and a $C_{13}$-$C_{15}$ aliphatic alcohol (2.59 g) were charged to a three necked flask fitted with a condenser and thermometer, upon which they were heated to 85° C. for two hours under nitrogen. The reaction mixture was then devolatilised at 85° C. under reduced pressure (100 mbar) for two hours. The resulting hazy fluid was an amino-functional polydimethylsiloxane copolymer end capped with a mixture of $C_{13}$-$C_{15}$ alkoxy, methoxy and silanol end groups. The polymer had a viscosity of 1,297 cP.

Example 10

A silanol end-blocked polydimethylsiloxane with a viscosity of approximately 60 cP (349.3 g), aminoethyl-aminoisobutyl methyl dimethoxy silane (18.38 g), lactic acid (0.37 g) and a $C_{13}$-$C_{15}$ aliphatic alcohol (7.35 g) were charged to a three necked flask fitted with a condenser and thermometer, upon which they were heated to 85° C. for two hours under nitrogen. The reaction mixture was then devolatilised at 85° C. under reduced pressure (140 mbar) for two hours. The resulting hazy fluid was an amino-functional polydimethylsiloxane copolymer end capped with a mixture of $C_{13}$-$C_{15}$ alkoxy, methoxy and silanol end groups. The polymer had a viscosity of 1,779 cP.

Example 11

A silanol end-blocked polydimethylsiloxane with a viscosity of approximately 60 cP (314.1 g), aminoethyl-aminoisobutyl methyl dimethoxy silane (16.52 g), lactic acid (0.33 g), $C_{13}$-$C_{15}$ aliphatic alcohol (6.60 g) and isopropanol (37.5 g) were charged to a three necked flask fitted with a condenser and thermometer, upon which they were heated to 80° C. for two hours under nitrogen. The reaction mixture was then devolatilised at 100° C. under reduced pressure (200 mbar) for two hours. The resulting clear fluid was an amino-functional polydimethylsiloxane copolymer end capped with a mixture of $C_{13}$-$C_{15}$ alkoxy, methoxy and silanol end groups. The polymer had a viscosity of 2,556 cP.

Example 12

A silanol end-blocked polydimethylsiloxane with a viscosity of approximately 60 cP (139.1 g), aminoethyl-aminoisobutyl methyl dimethoxy silane (7.35 g), lactic acid (0.25 g) and isopropanol (14 g) were charged to a three necked flask fitted with a condenser and thermometer, upon which they were heated to 80° C. for two hours under nitrogen. The reaction mixture was then devolatilised at 85° C. under reduced pressure (100 mbar) for four hours. The resulting clear fluid was an amino-functional polydimethylsiloxane copolymer end capped with methoxy and silanol end groups. The polymer had a viscosity of 5,136 cP.

Example 13

A silanol end-blocked polydimethylsiloxane with a viscosity of approximately 60 cP (139.1 g), aminoethyl-aminoisobutyl methyl dimethoxy silane (7.35 g), lactic acid (0.25 g) and isopropanol (14 g) were charged to a three necked flask fitted with a condenser and thermometer, upon which they were heated to 80° C. for two hours under nitrogen. The reaction mixture was then devolatilised at 85° C. under reduced pressure (100 mbar) for eight hours. The resulting clear fluid was an amino-functional polydimethylsiloxane copolymer end capped with methoxy and silanol end groups. The polymer had a viscosity of 980,051 cP.

Example 14

A silanol end-blocked polydimethylsiloxane with a viscosity of approximately 60 cP (98.3 g), aminopropyl methyl diethoxy silane (3.2 g) and octanoic acid (0.53 g) were charged to a three necked flask fitted with a condenser and thermometer, upon which they were heated to 85° C. for two hours under nitrogen. The reaction mixture was then devolatilised at 100° C. under reduced pressure (200 mbar) for three hours. The resulting clear fluid was an amino-functional polydimethylsiloxane copolymer end capped with methoxy and silanol end groups. The polymer had a viscosity of 1064 cP.

Example 15

A silanol end-blocked polydimethylsiloxane with a viscosity of approximately 60 cP (139 g), aminoethyl-aminoisobutyl methyl dimethoxy silane (7.35 g), lactic acid (0.25 g), isopropanol (14.1 g) and hexadecanol (20 g) were charged to a three necked flask fitted with a condenser and thermometer, upon which they were heated to 85° C. for two hours under nitrogen. The reaction mixture was then devolatilised at 85° C. under reduced pressure (100 mbar) for four hours. The resulting fluid was an amino-functional polydimethylsiloxane copolymer end capped with $C_{16}$ alkoxy, methoxy and silanol end groups. The polymer was a low melting wax-like material with a melting point between 40° C. and 50° C.

Example 16

A silanol end-blocked polydimethylsiloxane with a viscosity of approximately 60 cP (237.6 g), aminoethyl-aminoisobutyl methyl dimethoxy silane (5.37 g), lactic acid (0.61 g) and isopropanol (30 g) were charged to a three necked flask fitted with a condenser and thermometer, upon which they were heated to 85° C. for two hours under nitrogen. The reaction mixture was then devolatilised at 85° C. under reduced pressure (100 mbar) for four hours, upon which a $C_{13}$-$C_{15}$ aliphatic alcohol (27 g) was added. The reaction mixture was then devolatilised at 85° C. and 100 mbar for a further two hours. The resulting clear fluid was an amino-functional polydimethylsiloxane copolymer end capped with $C_{13}$-$C_{15}$ alkoxy, methoxy and silanol end groups. The polymer had a viscosity of 1,795 cP.

Example 17

A silanol end-blocked polydimethylsiloxane with a viscosity of approximately 60 cP (275.5 g), aminoethyl-aminoisobutyl methyl dimethoxy silane (9.54 g), lactic acid (2.67 g), isopropanol (33 g) and a $C_{13}$-$C_{15}$ aliphatic alcohol (4.95 g) were charged to a three necked flask fitted with a condenser and thermometer, upon which they were heated to 85° C. for two hours under nitrogen. The reaction mixture was then devolatilised at 85° C. under reduced pressure (100 mbar) for four hours, upon which further $C_{13}$-$C_{15}$ aliphatic alcohol (10 g) was added. The reaction mixture was then devolatilised at 85° C. and 100 mbar for a further two hours. The resulting clear fluid was an amino-functional polydimethylsiloxane copolymer end capped with $C_{13}$-$C_{15}$ alkoxy, methoxy and silanol end groups. The polymer had a viscosity of 1,516 cP.

Example 18

A silanol end-blocked polydimethylsiloxane with a viscosity of approximately 60 cP (98 g), aminopropylmethyl diethoxy silane (2.0 g) and octanoic acid (0.1 g) were charged to a three necked flask fitted with a condenser and thermometer, upon which they were heated to 85° C. for two hours under nitrogen. The reaction mixture was then devolatilised at 100° C. under reduced pressure (200 mbar) for four hours, upon which water (10% w/w) was added. The resulting milky white fluid was an amino-functional polydimethylsiloxane copolymer end capped with methoxy and silanol end groups. The polymer had a viscosity of 1,159 cP.

Example 19

A silanol end-blocked polydimethylsiloxane with a viscosity of approximately 60 cP (96.7 g), aminoethyl-aminoisobutyl methyl dimethoxy silane (1.99 g), octanoic acid (0.33 g) and a $C_{13}$-$C_{15}$ aliphatic alcohol (1.24 g) were charged to a three necked flask fitted with a condenser and thermometer, upon which they were heated to 85° C. for two hours under nitrogen. The reaction mixture was then devolatilised at 85° C. under reduced pressure (100 mbar) for five hours upon which water (10% w/w) was added. The resulting milky white fluid was an amino-functional polydimethylsiloxane copolymer end capped with a mixture of $C_{13}$-$C_{15}$ alkoxy, methoxy and silanol end groups. The polymer had a viscosity of 4,615 cP.

Example 20

A silanol end-blocked polydimethylsiloxane with a viscosity of approximately 60 cP (139 g), aminoethyl-aminoisobutyl methyl dimethoxy silane (7.35 g), propan-2-ol (14 g) and lactic acid (0.25 g) were charged to a three necked flask fitted with a condenser and thermometer, upon which they were refluxed for two hours under nitrogen. The propan-2-ol was then removed under reduced pressure (100 mbar). After 1 hour, decamethylcyclopentasiloxane (146.35 g) was added and the reaction continued at 85° C./100 mbar. After 6.5 hours the reaction was stopped. The resulting solution of an amino-functional polydimethylsiloxane copolymer in decamethylcyclopentasiloxane had a viscosity of 60,000 cts. $^{29}$Si NMR analysis showed no formation of octamethylcyclotetrasiloxane.

Example 21

A silanol end-blocked polydimethylsiloxane with a viscosity of approximately 60 cP (170 g), aminoethyl-aminoisobutyl methyl dimethoxy silane (10.1 g) and octanoic acid (2.0 g) were charged to a three necked flask fitted with a condenser and thermometer, upon which they were heated to 85° C. for two hours under nitrogen. The reaction mixture was then devolatilised at 85° C. under reduced pressure (100 mbar) for four hours. The reaction mixture was then cooled to 50° C. upon which glycidol (8.0 g) was added. The reaction was held at 50° C. for four hours and then heated to 85° C. and held at this temperature for a further two hours. The resulting clear fluid was an aminopolyol-functional polydimethylsiloxane copolymer end capped with $C_{13}$-$C_{15}$ alkoxy, methoxy and silanol end groups. The polymer had a viscosity of 25,000 cP.

Example 22

A silanol end-blocked polydimethylsiloxane with a viscosity of approximately 60 cP (170 g), aminoethyl-aminoisobutyl methyl dimethoxy silane (10.1 g) and octanoic acid (5.0 g) were charged to a three necked flask fitted with a condenser and thermometer. The reagents were allowed to stir at room temperature for two hours. After two hours the above cold-blend (15.0 g) was mixed with Softanol 50 (3 g) and Softanol 70 (6 g) for ten minutes after which water (7.2 g) was added. Softanol 50 and Softanol 70 are ethoxylated C12-14 secondary alcohol surfactants with 5 and 7 ethylene oxide groups respectively. The resulting thick phase was stirred for a further ten minutes upon which further water was added over the period of an hour (68.5 g). On complete addition of the water, acetic acid was added (0.25 g) and the resulting microemulsion heated to 85° C. under reduced pressure (400 mbar) for a further six hours yielding an aminofunctional siloxane microemulsion.

What is claimed is:

1. An amino-functional polysiloxane of the formula

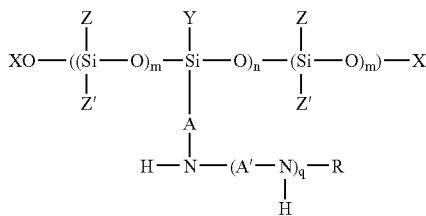

wherein A and A' are each independently a linear or branched alkylene group having 1 to 6 carbon atoms; q=0-4;

R is selected from the group consisting of hydrogen, an alkyl group, and a hydroxyalkyl group having 1 to 4 carbon atoms;

Y is an alkyl or aryl group;

Z and Z', which can be the same or different, are each an optionally substituted alkyl or aryl group;

X is hydrogen or an aliphatic group optionally containing one or more ether linkages, with the proviso that at least one X is an aliphatic group having 8 to 30 carbon atoms;

m=4-100; and n is 1-1000.

2. An amino-functional polysiloxane according to claim 1 wherein 0.2-25% of the amino groups are in carboxylate salt form.

3. A process for the preparation of an amino-functional polysiloxane comprising reacting an aminosilane (A) which contains an aminoalkyl group and at least one alkoxy group bonded to Si with a carboxylic acid (C), a silanol-functional polysiloxane (B) and an aliphatic alcohol having 8 to 30 carbon atoms, the amount of carboxylic acid (C) being such that the molar ratio of carboxylic acid groups of (C) to amino groups of aminosilane (A) is less than 1:1 and the amount of silanol-functional polysiloxane (B) being such that the molar ratio of silanol groups of (B) to Si-bonded alkoxy groups of aminosilane (A) is greater than 1:1, whereby the aminosilane (A) is partially converted into its carboxylate salt which acts as a catalyst for the siloxane condensation polymerization reaction between (A) and (B).

4. A process according to claim 3, wherein the aminosilane (A) has the formula

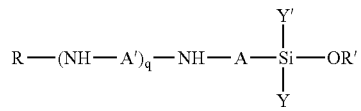

wherein A and A' are each independently a linear or branched alkylene group having 1 to 6 carbon atoms; q=0-4; R is selected from the group consisting of hydrogen, an alkyl group, and a hydroxyalkyl group having 1 to 4 carbon atoms; R' is selected from the group consisting of an alkyl group and an alkoxyalkyl group having 1 to 6 carbon atoms; and Y and Y' are each independently selected from the group consisting of a group OR', substituted alkyl groups, substituted aryl groups, unsubstituted alkyl groups, and unsubstituted aryl groups.

5. A process according to claim 4, wherein the group Y of aminosilane (A) is an unsubstituted alkyl group and the group Y' is of the formula —OR'.

6. A process according to claim 4 wherein the linkages A and A' of aminosilane (A) are each independently a linear or branched alkylene group having 2 to 4 carbon atoms; q=1; and R is hydrogen.

7. A process according to claim 5 wherein the silanol-functional polysiloxane (B) is a linear hydroxyl endblocked polydimethylsiloxane of degree of polymerisation 4-1000.

8. A process according to claim 3 wherein the silanol-functional polysiloxane (B) is a linear hydroxyl endblocked polydiorganosiloxane containing methyl groups and 2-30 carbon atoms containing groups selected from the group consisting of alkyl groups, alkenyl groups, aryl groups, and aralkyl groups.

9. A process according to claim 3 wherein the carboxylic acid (C) is substituted by an electron-withdrawing moiety.

10. A process according to claim 9 wherein the carboxylic acid (C) is selected from the group consisting of lactic acid and fluoroalkanoic acids.

11. A process according to claim 3 wherein the carboxylic acid is an aliphatic carboxylic acid having 6 to 20 carbon atoms.

12. A process according to claim 3 wherein the amount of carboxylic acid (C) is such that the molar ratio of carboxylic acid groups of (C) to amino groups of aminosilane (A) is 0.002-0.25:1.

13. A process according to claim 3 wherein the amount of silanol-functional polysiloxane (B) is such that the molar ratio of silanol groups of (B) to Si-bonded alkoxy groups of aminosilane (A) is 1.2-2.0:1.

14. A process according to claim 3 wherein an alcohol is co-reacted with the aminosilane (A), carboxylic acid and silanol-functional polysiloxane (B).

15. A process according to claim 14 wherein the alcohol is selected from the group consisting of an ether alcohol and hydroxy-terminated polyether.

16. A process according to claim 3 wherein the carboxylic acid (C) is selected from the group consisting of an alkanoic acid having 1 to 3 carbon atoms and a hydroxy-substituted carboxylic acid and the alcohol is selected from the group consisting of a linear alkanols having 2 to 4 carbon atoms and branched alkanols having 2 to 4 carbon atoms.

17. A process according to claim 3 wherein the condensation reaction between (A) and (B) is carried out at a temperature in the range 60-140° C.

18. A process according to claim 3 wherein a material selected from the group consisting of water and an alcohol endblocker is added to the reagents after a desired reaction time in order to quench reaction.

19. A process for the preparation of an amino-functional polysiloxane comprising reacting an aminosilane (A) which contains an aminoalkyl group and at least one alkoxy group bonded to Si with a carboxylic acid (C) and a silanol-functional polysiloxane (B), the amount of carboxylic acid (C) being such that the molar ratio of carboxylic acid groups of (C) to amino groups of aminosilane (A) is less than 1:1 and the amount of silanol-functional polysiloxane (B) being such that the molar ratio of silanol groups of (B) to Si-bonded alkoxy groups of aminosilane (A) is greater than 1:1, whereby the aminosilane (A) is partially converted into its carboxylate salt which acts as a catalyst for the siloxane condensation polymerization reaction between (A) and (B), wherein a non-reactive polysiloxane having a viscosity of less than 375 mPas is added to the reagents and reaction is continued in the non-reactive polysiloxane as diluent, thereby forming a solution of amino-functional polysiloxane in the non-reactive polysiloxane.

20. A process according to claim 19 in which the non-reactive polysiloxane is a cyclic polysiloxane having at least 5 silicon atoms.

21. A process according to claim 19 in which the non-reactive polysiloxane is a trimethylsilyl-terminated polydimethylsiloxane.

22. A process for the preparation of an amino-functional polysiloxane comprising reacting an aminosilane (A) which contains an aminoalkyl group and at least one alkoxy group bonded to Si with a carboxylic acid (C) and a silanol-functional polysiloxane (B), the amount of carboxylic acid (C) being such that the molar ratio of carboxylic acid groups of (C) to amino groups of aminosilane (A) is less than 1:1 and the amount of silanol-functional polysiloxane (B) being such that the molar ratio of silanol groups of (B) to Si-bonded alkoxy groups of aminosilane (A) is greater than 1:1, whereby the aminosilane (A) is partially converted into its carboxylate salt which acts as a catalyst for the siloxane condensation polymerization reaction between (A) and (B), wherein the aminosilane (A), the carboxylic acid and the silanol-functional polysiloxane (B) are mixed with a surfactant and water to form an emulsion, and the condensation reaction between (A) and (B) is carried out in the emulsion, thereby forming an emulsion of an amino-functional polysiloxane.

23. A process according to claim 22 wherein the aminosilane (A), carboxylic acid, silanol-functional polysiloxane (B), surfactant and water are mixed to form an emulsion at a temperature below 50° C. and the emulsion is heated to a temperature in the range 60-140° C. to effect the condensation reaction.

* * * * *